No. 712,757. Patented Nov. 4, 1902.
H. C. BOWLUS.
AUTOMATIC WEIGHING MACHINE.
(Application filed Mar. 15, 1902.)
(No Model.) 2 Sheets—Sheet 1.
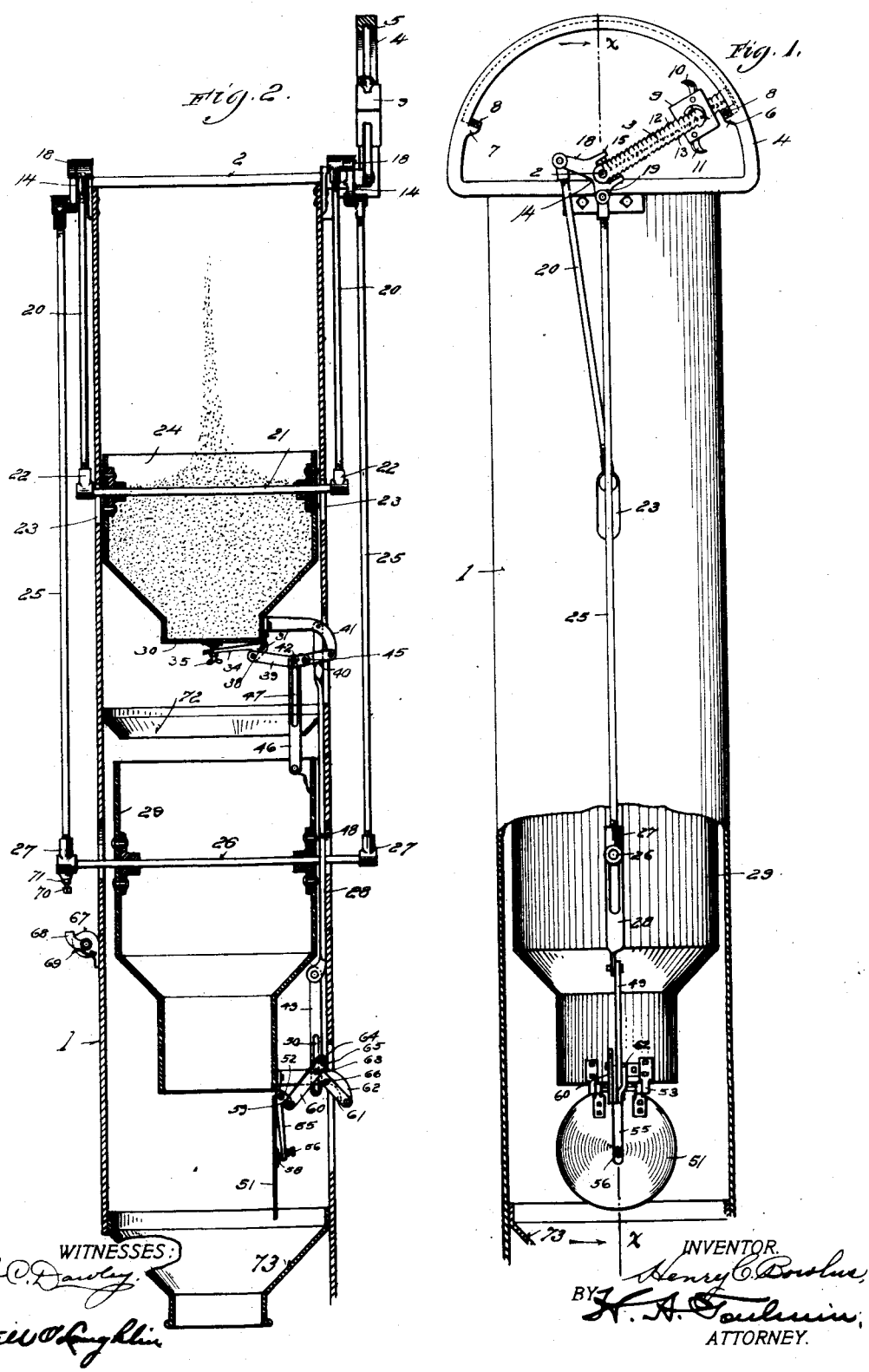
WITNESSES:
INVENTOR.
ATTORNEY.

No. 712,757. Patented Nov. 4, 1902.
H. C. BOWLUS.
AUTOMATIC WEIGHING MACHINE.
(Application filed Mar. 15, 1902.)
(No Model.) 2 Sheets—Sheet 2.
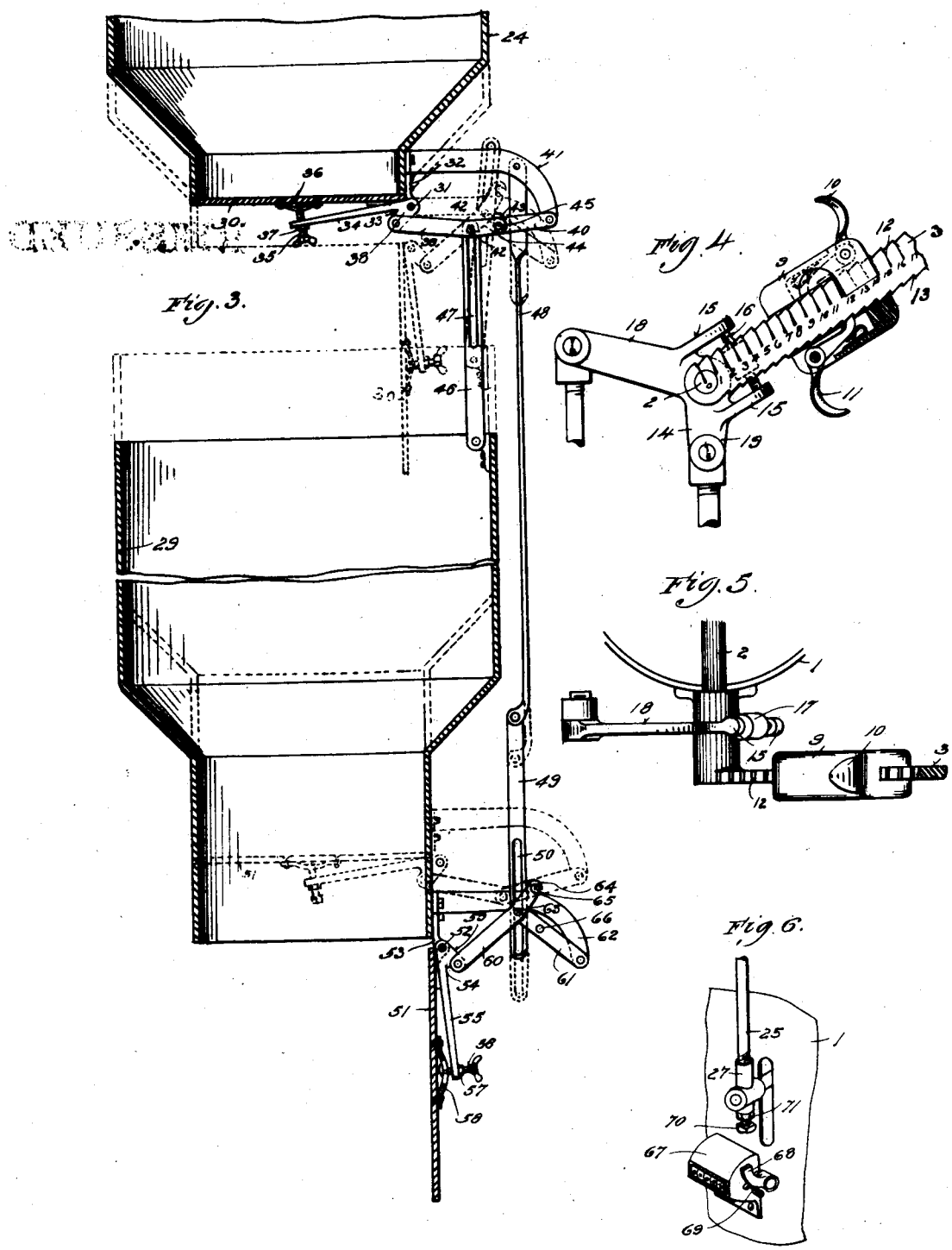
WITNESSES:
INVENTOR
Henry C. Bowlus,
ATTORNEY.

UNITED STATES PATENT OFFICE.

HENRY C. BOWLUS, OF SPRINGFIELD, OHIO.

AUTOMATIC WEIGHING-MACHINE.

SPECIFICATION forming part of Letters Patent No. 712,757, dated November 4, 1902.

Application filed March 15, 1902. Serial No. 98,299. (No model.)

*To all whom it may concern:*

Be it known that I, HENRY C. BOWLUS, a citizen of the United States, residing at Springfield, in the county of Clark and State of Ohio, have invented certain new and useful Improvements in Automatic Weighing-Machines, of which the following is a specification, reference being had therein to the accompanying drawings.

This invention relates to automatic weighing-machines, and while capable of other applications is devised more particularly for the weighing of grain or the like as it is discharged in a continuous stream or flow from any suitable source of supply.

The invention has for its object to provide a simple and accurate mechanism whereby the flowing grain may be weighed and the weight registered; and to these ends the invention consists in certain novel features which I will now proceed to describe and will then particularly point out in the claims.

In the accompanying drawings, Figure 1 is a side elevation, partly broken away, of an apparatus embodying my invention in one form. Fig. 2 is a sectional view of the same, taken on the line $x\ x$ of Fig. 1 and looking in the direction of the arrows. Fig. 3 is an enlarged detail view, partly broken away, of the weighing-hoppers and portions of their associated mechanisms, the same being in vertical section in the same plane as Fig. 2. Fig. 4 is an enlarged detail view of a portion of the mechanism. Fig. 5 is a plan view of the portion of the structure shown in Fig. 4, and Fig. 6 is a detail perspective view of the register and its operating means.

In the said drawings, in which I have shown one embodiment of my invention, 1 indicates a suitable support or frame by which the mechanism is supported and which in the form shown consists of a tubular body or hollow cylinder. Mounted in suitable bearings on the top of this support is a rock-shaft 2, carrying a scale-beam or weight-arm 3, preferably secured to one end thereof and adapted to move through an arc of a circle extending on each side of the vertical. In order to guide and limit the motion of this scale-beam or weight-arm, I employ an arc-shaped or segmental bar 4, mounted on top of the support 1 at one side thereof and provided with a grooved way 5, into which the end of the scale-beam 3 extends and by means of which it is guided and supported laterally. This segmental guide is provided with stop shoulders or projections 6 and 7 on opposite sides thereof, having cushions 8 to receive the impact and diminish the shock of the scale-beam.

9 indicates a poise or weight mounted and adjustable on the scale-beam and provided with spring-pawls 10 and 11, which respectively engage with oppositely-arranged ratchet-teeth 12 and 13 on opposite edges of the scale-beam, as shown more particularly in Fig. 4 of the drawings.

A bell-crank lever 14 is secured on the rock-shaft 2 adjacent to the scale-beam 3 and provided with lugs 15, carrying a threaded rod 16, on which is adjustably mounted a threaded counterpoise-weight 17, by the adjustment of which the parts of the mechanism may be properly counterbalanced, so as to cause the poise 9 to correctly weigh the grain. The bell-crank lever 14 is provided with a long arm 18 and a short arm 19, the former being preferably twice the length of the latter. A similar bell-crank lever 14 is secured to the other end of the rock-shaft 2. To the ends of the longer arms of the bell-cranks 14 are pivoted links 20, which extend down on each side of the apparatus outside of the support 1 and are pivotally connected at their lower ends to a shaft 21 by means of suitable bearings 22, such as knife-edge bearings, or any other approved form of connection. The shaft 21 extends through slots 23 in the support 1 and has secured to it within said support the upper weighing-hopper 24, which is free to move vertically in the manner hereinafter described. To the shorter arms 19 of the bell-cranks 14 are pivoted the upper ends of links 25, which also extend downward on the outside of the support 1 to a point below the upper hopper 24, where their lower ends are connected to a shaft 26 by means of bearings 27, similar to the bearings 22. The shaft 26 extends through slots 28 in the support or casing 1 and has secured to it within said support or casing the lower or main weighing-hopper 29, which is preferably of a capacity double that of the upper weighing-hopper 24 and which is also capable of vertical movement within the support or casing 1 in the manner hereinafter described.

The upper weighing-hopper 24 is provided at its discharge-mouth with a closure or gate 30, which in the present instance is shown as a hinged gate or closure, being secured to a pivotal axis or shaft 31, mounted in brackets 32, secured to the hopper 24. There is also secured to the shaft 31 a lever 33, one arm 34 of which is provided with a threaded aperture, in which is adjustably mounted a screw-bolt 35, one end of which is swiveled in a slotted casting 36, secured to the under side of the closure or gate 30. A lock-nut 37 is mounted on the bolt 35, so as to lock the same in position after adjustment. The lever 33 has a second arm 38, to which is pivoted one end of one member 39 of a pair of toggles, the other member 40 of which is pivoted at one end to a bracket 41, secured to the hopper 24. The meeting ends of the toggles 39 and 40 are connected by a pivot-pin 42, and the downward movement of said toggles is limited by extending one of them—as, for instance, the toggle 39—beyond the pivot 42, as indicated at 43, and providing said extension 43 with a notch or slot 44 to receive a pin 45 on the other member 40 of the toggle. The locked position of these toggle members is shown in full lines in Fig. 3, and the adjustable connection between the arm 34 of the lever 33 and the closure or gate 40 is for the purpose of insuring the accurate closing of said gate when the toggles are in the locked position just referred to, in which position the pivot 42 is below the line connecting the pivots of the outer ends of the members 39 and 40. The lower hopper 29 has pivoted to its upper edge a link 46, provided with a slot 47, in which the pivot 42 travels.

Connected to the bracket 41 or in some other way suitably connected to the upper hopper 24 is a rod or bar 48, which has pivoted to its lower end a link 49, having a slot 50.

The lower hopper 29 is provided with a gate or closure 51, secured on a pivot-shaft 52, mounted in brackets 53, secured to the lower hopper. This shaft also has secured on it a lever 54, one arm 55 of which has a threaded aperture to receive a screw-bolt 56, provided with a lock-nut 57 and having its end swiveled in a slotted casting 58, secured to the gate 51. The lever 54 is provided with a second arm 59, to which is pivoted one end of one member 60 of a pair of toggles, the other member 61 being pivoted at one end to a bracket 62, secured to the hopper 29. The meeting ends of the toggle members 60 and 61 are connected by a pivot-pin 63, and one of the members—as, for instance, the member 60—is provided with an extension 64, having a slot or notch 65 to engage a pin 66 on the other member 61, and thereby limit the downward motion of said toggles, at which limit the pivot 63 is below the line connecting the pivots of the outer ends of the toggle members 60 and 61. It will be noted that provision is made by the construction described to adjust the gate 51 relatively to the toggle members 60 and 61, so as to insure its accurate closing when the toggle members are locked in their downward position. The pivot-pin 63 travels in the slot 50 of the link 49.

A suitable register is provided to register the number of operations or movements of the hoppers, and in the present instance I have shown a register 67 as mounted on the outside of the casing or support 1 and provided with a tappet-arm 68, which lies in the path of a moving part of the mechanism, being provided with a spring 69 to hold it in its normal position. In the present instance I have shown one of the bearings 27 as having threaded therein a screw-bolt 70, the head of which is adapted to contact with the tappet-arm 68, the screw-bolt being adjustable to insure proper operation of the register and being secured after adjustment by a lock-nut 71.

In order to prevent the grain from passing from the upper hopper between the lower hopper and the casing or support, I have provided this latter with an internal inclined guiding-flange or deflecting-plate 72, located between the two hoppers, and in order to insure the proper discharge of the grain from the apparatus after being weighed I have also shown the support or casing as being provided below the lower weighing-hopper with a discharge-spout 73.

The operation of the apparatus is as follows: The parts being in the position shown in full lines, the material to be weighed is discharged in a continuous stream into the upper weighing-hopper 24, where it accumulates until its weight is sufficient to overcome the resistance of the poise 9, which has previously been adjusted to the desired point on the scale-beam 3. The hopper 24 then moves downward, carrying the scale-beam and its poise upward until they have passed the vertical, whereupon they fall by gravity over to the other side of the segment-guide 4, the scale-beam resting on the stop 7. During this downward movement of the hopper 24 a corresponding upward movement of the hopper 29 takes place. The first result of this movement of the hoppers, so far as the closures or gates thereof are concerned, is that the upper end of the slot 50 in the link 49 comes into contact with the pivot-pin 63 of the toggles 60 and 61, forcing the same downward and closing the gate 51 of the lower hopper, which is held closed and locked by the toggles, as shown in dotted lines in Fig. 3. Subsequently the lower end of the slot 47 in the link 46 comes into contact with the pivot-pin 42 of the toggles 39 and 40 and forces said pin upward until the toggle-joint breaks upward in the manner indicated in dotted lines in Fig. 3, thereby permitting the closure 30 of the upper hopper to open. The grain in the upper hopper then passes into and is retained in the lower hopper, and the flow of grain continues through the upper hopper, the gate of which is now open, into the lower hopper, the gate of which is closed, until a sufficient quantity of grain has accumulated in the lower hopper to overcome the poise 9. The arm 19 being of one-half the length of the arm 18, it will of course require twice as much grain in the lower hopper to swing the scale-beam and weight over as in the case of the upper hopper. It will be understood, however, that the proportions of the arms and hoppers may be varied, it being only essential that the lower hopper shall be the larger, and consequently that the arms of the bell-cranks to which said lower hopper is connected shall be shorter than the arms to which the upper hopper is connected. When the scale-beam and poise have been lifted past the vertical by the weight of the grain in the lower hopper, said lower hopper moves downward, the beam and poise swinging over against the stop 6. At the same time the upper hopper 24 moves upward or in the opposite direction, and the pivot-pin 42 of the toggles 39 and 40 comes into contact with the upper end of the slot 47 in the link 46, pulling the toggles down into the locked position shown in full lines in Fig. 3 and closing the gate 30 of the upper hopper. Subsequently the pivot-pin 63 of the toggles 60 and 61 comes into contact with the lower end of the slot 50 in the link 49, thereby breaking the said toggles upward and permitting the gate 51 of the lower hopper to swing open and discharge the grain from the lower hopper into any suitable receptacle provided for the purpose. The parts are then in their original position shown in full lines, and the grain accumulates in the upper hopper until the same cycle of operations is again performed. The register serves in an obvious manner to indicate the number of times the apparatus has gone through said cycle of operations, and consequently it indicates the total weight of grain which has passed through the machine, since the amount passing through at each operation is determined by the poise 9.

It will be observed that a single rock-shaft provided with a scale-beam and poise controls the movement of both hoppers, which move in opposite directions alternately toward and from each other. The upper hopper constitutes a receiving-hopper, so connected to the scale-beam and poise as to set the same in weighing position for the lower hopper, which is the weighing-hopper proper, by means of the weight of a portion of the grain. The grain then passes directly through the receiving-hopper into the weighing-hopper until this latter receives its full quota, whereupon the receiving-hopper is closed to receive the flow of the grain while the weighing-hopper is discharging, and continues so to receive the grain until a sufficient portion thereof has accumulated in said upper hopper to again set the scale-beam and poise in position to weigh the grain in the weighing-hopper proper. The closures or gates of the two hoppers are controlled by the movements of said hoppers toward and from each other, and the toggle mechanisms of said closures, or gates not only portions of the closure-operating mechanisms, but also locking devices which lock the gates in their closed position and which are controlled by the movements of the hoppers toward and from each other, being released at the proper times to permit the closures or gates to open by gravity, but serving to positively close them. The apparatus is simple in construction and accurate as well as automatic in operation. The construction is such that after the slotted links have moved the toggle-knuckles slightly past the alinement position said knuckles move away from the ends of the slots in the links, moving to the locked position by gravity and being clear of the ends of the slots when locked, so that there is no direct connection between the two hoppers by which the weight of one would affect the other.

I do not wish to be understood as limiting myself to the precise details of construction hereinbefore described and shown in the accompanying drawings, as these details may obviously be modified without departing from the principle of my invention.

Having thus fully described my invention, what I claim as new, and desire to secure by Letters Patent, is—

1. In an automatic weighing-machine, the combination, with a support or casing, of a rock-shaft provided with a scale-beam and poise arranged to swing to each side of the vertical, arms of different lengths projecting from said rock-shaft at an angle to each other, two superposed hoppers movable toward and from each other and respectively connected to the longer and shorter arms of the rock-shaft, and closures for the discharge-mouths of said hoppers controlled by the movements thereof, substantially as described.

2. In an automatic weighing-machine, the combination, with a support or casing, of a rock-shaft provided with a scale-beam and poise arranged to swing to each side of the vertical, arms of different lengths projecting from said rock-shaft at an angle to each other, an upper receiving-hopper and a lower weighing-hopper movable vertically toward and from each other and connected respectively to the longer and shorter arms of the rock-shaft, and closures for the discharge-mouths of said hoppers controlled by the movements thereof, the weight of the material in the receiving-hopper causing said hoppers to approach each other, thereby swinging over the scale-beam into position on one side of the vertical for weighing the material in the weighing-hopper, closing the weighing-hopper discharge and opening the receiving-hopper discharge, whereby the material may pass through the receiving-hopper into the weighing-hopper, the weight of the material in the weighing-hopper subsequently swinging the scale-beam over to the other side of the vertical, closing the receiving-hopper discharge and opening the weighing-hopper discharge as the hoppers recede from each other, substantially as described.

3. In an automatic weighing-machine, the combination, with a support or casing, of a rock-shaft provided with a scale-beam and poise arranged to swing to each side of the vertical, arms of different lengths projecting from said rock-shaft at an angle to each other, two superposed hoppers movable vertically toward and from each other and connected respectively to the longer and shorter arms of the rock-shaft, hinged gates or closures for the discharge-mouths of said hoppers adapted to open by gravity, locking-toggles carried by each hopper and connected with its gate or closure, and a link carried by each hopper and arranged to engage the central pivot of the toggles of the other hopper to operate the same to open and close the gate or closure thereof, substantially as described.

4. In an automatic weighing-machine, the combination, with a support or casing, of a rock-shaft provided with a scale-beam and poise arranged to swing to each side of the vertical, arms of different lengths projecting from said rock-shaft at an angle to each other, and two superposed hoppers movable toward and from each other and connected respectively to the longer and shorter arms of the rock-shaft, each of said hoppers being provided with a discharge closure or gate, a pivot-shaft to which said gate is secured, a lever mounted on said pivot-shaft and adjustably connected with the gate, a bracket, and toggles connected at their outer ends to said bracket and lever, one of said toggles being provided with a stop and the other with an extension to engage the same, each hopper being provided with a slotted link to engage the connecting-pivot of the toggles of the other hopper in each direction, substantially as described.

5. In an automatic weighing-machine, the combination, with a support or casing, of hoppers movable toward and from each other and provided with discharge-closures and means for operating the same, a rock-shaft having arms of different lengths projecting therefrom at an angle to each other and connected to the respective hoppers, a scale-beam provided with a poise secured to said rock-shaft and arranged to swing to each side of the vertical, and a segmental or arc-shaped bar provided with a grooved way to receive the end of the scale-beam and with terminal stops therefor, substantially as described.

6. In an automatic weighing-machine of the character described, the combination, with hoppers movable toward and from each other, and a rock-shaft having arms connected to said hoppers, of a scale-beam arranged to swing to each side of the vertical and provided on its opposite edges with oppositely-arranged ratchet-teeth, and a poise or weight mounted on said scale-beam and provided with oppositely-arranged spring-pawls to engage the respective sets of ratchet-teeth, substantially as described.

7. In an automatic weighing-machine, the combination, with a support or casing, of hoppers movable vertically toward and from each other, a rock-shaft provided with a scale-beam and poise arranged to swing to each side of the vertical, and bell-crank levers secured on said rock-shaft and having arms of different lengths to which the hoppers are respectively connected, one of said bell-cranks being provided with lugs, and a threaded rod mounted therein, and a threaded counterpoise-weight mounted on said threaded rod, substantially as described.

In testimony whereof I affix my signature in presence of two witnesses.

HENRY C. BOWLUS.

Witnesses:
E. O. HAGAN,
IRVINE MILLER.